United States Patent
Duchin et al.

(10) Patent No.: US 9,614,838 B1
(45) Date of Patent: Apr. 4, 2017

(54) TAKING A PICTURE OF A ONE-TIME USE PASSCODE AND USING THE PICTURE TO AUTHENTICATE

(71) Applicant: EMC Corporation, Hopkinton, MA (US)

(72) Inventors: Zohar Duchin, Hertzliya (IL); Marcelo Blatt, Modiin (IL); Alex Zaslavsky, Petah Tiqwa (IL); Liron Liptz, Even Yehuda (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/662,377

(22) Filed: Mar. 19, 2015

(51) Int. Cl.
| | |
|---|---|
| *H04L 29/06* | (2006.01) |
| *G06F 21/36* | (2013.01) |
| *G06F 21/35* | (2013.01) |
| *G06F 21/34* | (2013.01) |
| *H04W 12/06* | (2009.01) |
| *G06F 21/32* | (2013.01) |
| *G06F 21/33* | (2013.01) |
| *H04L 9/32* | (2006.01) |

(52) U.S. Cl.
CPC .......... *H04L 63/0838* (2013.01); *G06F 21/32* (2013.01); *G06F 21/33* (2013.01); *G06F 21/34* (2013.01); *G06F 21/35* (2013.01); *G06F 21/36* (2013.01); *H04L 9/3228* (2013.01); *H04W 12/06* (2013.01)

(58) Field of Classification Search
CPC ... H04L 63/0838; H04L 9/3228; G06F 21/32; G06F 21/33; G06F 21/34; G06F 21/35; G06F 21/36; H04W 12/06
See application file for complete search history.

(56) References Cited

U.S. PATENT DOCUMENTS

| | | | |
|---|---|---|---|
| 4,879,747 A | 11/1989 | Leighton et al. | |
| 8,024,576 B2 * | 9/2011 | Gargaro | G06Q 20/382 705/64 |

(Continued)

OTHER PUBLICATIONS

Sun, He, et al. "TrustOTP: Transforming Smartphones into Secure One-Time Password Tokens." Proceedings of the 22nd ACM SIGSAC Conference on Computer and Communications Security. ACM, 2015. (pp. 976-988).*

(Continued)

*Primary Examiner* — Kari Schmidt
(74) *Attorney, Agent, or Firm* — BainwoodHuang

(57) ABSTRACT

Techniques involve a user taking a picture of a current one-time use passcode (OTP) and using the picture to authenticate. Such techniques alleviate the burden and frustration of the user having to manually type in the current OTP. Additionally, the user will not trigger a lockout via accidental typing errors. Furthermore, the current OTP can be augmented to include more than a string of six or eight alphanumeric characters for stronger security (e.g., by using non-alphanumeric characters, by capturing multi-digit seven-segment LCD display patterns, by using a QR code, by using a randomly selected image, etc.). One technique involves taking a picture of an OTP provided by a user. The particular technique further involves extracting the OTP from the picture and performing an authentication operation based on the OTP extracted from the picture to determine whether the user is authentic.

16 Claims, 6 Drawing Sheets

(56) References Cited

U.S. PATENT DOCUMENTS

| | | | |
|---|---|---|---|
| 8,607,331 B2 | 12/2013 | Sun et al. | |
| 8,656,455 B1 | 2/2014 | Bailey et al. | |
| 8,661,254 B1 * | 2/2014 | Sama | H04L 9/3215 380/247 |
| 8,726,405 B1 | 5/2014 | Bailey et al. | |
| 8,875,255 B1 | 10/2014 | Dotan et al. | |
| 8,909,933 B2 * | 12/2014 | Pieczul | H04L 9/3215 713/168 |
| 8,910,274 B2 * | 12/2014 | Sanders | G06F 21/34 726/19 |
| 9,076,061 B2 | 7/2015 | Zennaro et al. | |
| 2002/0093645 A1 * | 7/2002 | Heacock | A61B 3/152 356/138 |
| 2007/0220597 A1 * | 9/2007 | Ishida | G06Q 20/12 726/8 |
| 2009/0324025 A1 * | 12/2009 | Camp, Jr. | G07C 9/00007 382/124 |
| 2011/0161232 A1 * | 6/2011 | Brown | G06F 21/32 705/71 |
| 2012/0266224 A1 * | 10/2012 | Gruschka | G06F 21/35 726/7 |
| 2013/0185210 A1 * | 7/2013 | Dodson | H04L 63/08 705/44 |
| 2013/0198519 A1 * | 8/2013 | Marien | G06F 21/34 713/172 |
| 2014/0254865 A1 * | 9/2014 | Soubra | G06K 9/00624 382/103 |
| 2015/0040212 A1 * | 2/2015 | Kim | G06F 21/32 726/19 |
| 2015/0089607 A1 * | 3/2015 | Hubner | H04L 63/0838 726/6 |
| 2015/0371214 A1 * | 12/2015 | Schroder | H04L 63/0838 705/44 |

OTHER PUBLICATIONS

Le, Zhengyi, Xinwen Zhang, and Zeyu Gao. "NemoAuth: a mnemonic multimodal approach to mobile user authentication." TENCON 2013-2013 IEEE Region 10 Conference (31194). IEEE, 2013. (pp. 1-6).*

* cited by examiner

TAKING A PICTURE OF A ONE-TIME USE PASSCODE AND USING THE PICTURE TO AUTHENTICATE

BACKGROUND

Some conventional authentication systems require a human to maintain physical possession of a token and to provide a correct one-time use passcode (OTP) from the token to an authentication server before being allowed to access a protected resource. During authentication, the human reads a current OTP (i.e., a string of six or eight alphanumeric characters) from a display of the token and manually types the current OTP into a client apparatus which is in direct or indirect communication with the authentication server.

If the current OTP is correct (e.g., the current OTP matches an expected OTP on the authentication server), the authentication server outputs a signal which enables the human to access the protected resource. However, if the current OTP is incorrect (e.g., the current OTP does not match the expected OTP on the authentication server), the authentication server outputs a signal which prevents the human from accessing the protected resource.

SUMMARY

Unfortunately, there are deficiencies to the above-described conventional approach to reading a current one-time use passcode (OTP) from a display of a token and manually typing in the current OTP into a client apparatus in order to authenticate with an authentication server. For example, the requirement for the human to manually type a string of six or eight alphanumeric characters as the current OTP can be burdensome and frustrating particularly if the human is a slow typer, has poor eyesight, and/or is error prone. Additionally, if the human is not careful and reaches an authentication lockout limit (e.g., by failing three times in a row to authenticate), the authentication server may inconveniently lockout the human for a period of time (e.g., 10 minutes) or require the human to contact an administrator to reset the human's account. Furthermore, since a conventional OTP is a string of six or eight alphanumeric characters, the security of the conventional OTP is limited to the strength provided by the string of six or eight alphanumeric characters.

In contrast to the above-described conventional authentication approach which requires a human to read a current OTP from a display of a token and manually type in the current OTP into a client apparatus during authentication, improved techniques involve a user taking a picture of a current OTP and using the picture to authenticate. The current OTP is then extracted from the picture (e.g., using optical character recognition or OCR operations). Such techniques alleviate the burden and frustration of the user having to manually type in the current OTP. Additionally, the user will not trigger a lockout via accidental typing errors. Furthermore, the current OTP can be augmented to include more than a string of six or eight alphanumeric characters for stronger security (e.g., by using non-alphanumeric characters, by capturing longer multi-digit seven-segment LCD display patterns, by using a QR code, by using a randomly selected image, and so on).

One embodiment is directed to a computer-implemented method of providing authentication. The method includes taking, by processing circuitry, a picture of a OTP provided by a user. The method further includes extracting, by the processing circuitry, the OTP from the picture and performing, by the processing circuitry, an authentication operation based on the OTP extracted from the picture to determine whether the user is authentic.

In some arrangements, taking the picture of the OTP provided by the user includes capturing a digital photo of a display screen of a token apparatus while the display screen of the token apparatus electronically displays the OTP. Examples of suitable display screens include a multi-digit seven-segment LCD display, a touch screen of a mobile device, an electronic monitor of a laptop or desktop computer, and so on.

In some arrangements, extracting the OTP from the picture includes performing a set of optical character recognition (OCR) operations on the digital photo of the display screen to extract, as the OTP, a recognized series of OTP digits. Here, the OCR operations convert an image of the OTP into actual OTP digits (e.g., numbers, characters, meta-characters, etc.).

In some arrangements, performing the authentication operation includes providing the recognized series of OTP digits to an authentication server which compares the recognized series of OTP digits to an expected series of OTP digits. In this arrangement, performing the authentication operation further includes receiving an authentication result from the authentication server indicating whether the recognized series of OTP digits matched the expected series of OTP digits.

In some arrangements, the token apparatus is a hand-held hardware authentication token having, as the display screen, a multi-segment LCD screen. In these arrangements, capturing the digital photo includes using a digital camera to electronically acquire a two-dimensional pixelated image of the multi-segment LCD screen of the hand-held hardware authentication token while the user holds the multi-segment LCD screen of the hand-held hardware authentication token in front of a lens of the digital camera. Along these lines, the digital camera may be embedded within a smart mobile device, and capturing the digital photo may include storing the two-dimensional pixelated image in an image file within the smart mobile device.

In some arrangements, the token apparatus is a smart mobile device running a soft token application. In these arrangements, capturing the digital photo includes using a digital camera to electronically acquire a two-dimensional pixelated image of a touch screen of the smart mobile device while the user holds the touch screen of the smart mobile device in front of a lens of the digital camera. Here, the digital camera may be coupled to a desktop computer, and capturing the digital photo may include storing the two-dimensional pixelated image in an image file within the desktop computer.

In some arrangements, the processing circuitry includes an electronic display and a digital camera. In these arrangements, the method further includes, prior to capturing the digital photo, providing a set of instructions on the electronic display to direct the user to visually display the OTP to the digital camera.

In some arrangements, the method further includes, prior to extracting the OTP, displaying the digital photo on the electronic display and prompting the user for a command to submit the digital photo for authentication processing. Accordingly, the user may decide that the picture quality of the digital photo is poor or unacceptable, and re-take the picture of the OTP before entering the command to submit the digital photo for authentication processing.

Another embodiment is directed to an electronic apparatus which includes a digital camera, memory, and control circuitry coupled to the digital camera and the memory. The memory stores instructions which, when carried out by the control circuitry, cause the control circuitry to:
 (A) take a picture of a one-time passcode (OTP) provided by a user using the digital camera,
 (B) extract the OTP from the picture, and
 (C) perform an authentication operation based on the OTP extracted from the picture to determine whether the user is authentic.

Yet another embodiment is directed to a computer program product having a non-transitory computer readable medium which stores a set of instructions to provide authentication. The set of instructions, when carried out by computerized circuitry, causes the computerized circuitry to perform a method of:
 (A) taking a picture of a one-time passcode (OTP) provided by a user;
 (B) extracting the OTP from the picture; and
 (C) performing an authentication operation based on the OTP extracted from the picture to determine whether the user is authentic.

It should be understood that, in the cloud context, certain electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in a user taking a picture of a current OTP and using the picture to authenticate.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to a user taking a picture of a current one-time use passcode (OTP) and using the picture to authenticate. The current OTP is then extracted from the picture (e.g., using optical character recognition or OCR operations). Such a technique alleviates the burden and frustration of the user having to manually type in the current OTP. Additionally, the user will not trigger a lockout via accidental typing errors. Furthermore, the current OTP can be augmented to include more than a string of six or eight alphanumeric characters for stronger security (e.g., by using non-alphanumeric characters, by capturing longer multi-digit seven-segment LCD display patterns, by using a QR code, by using a randomly selected image, etc.).

Figure 1:
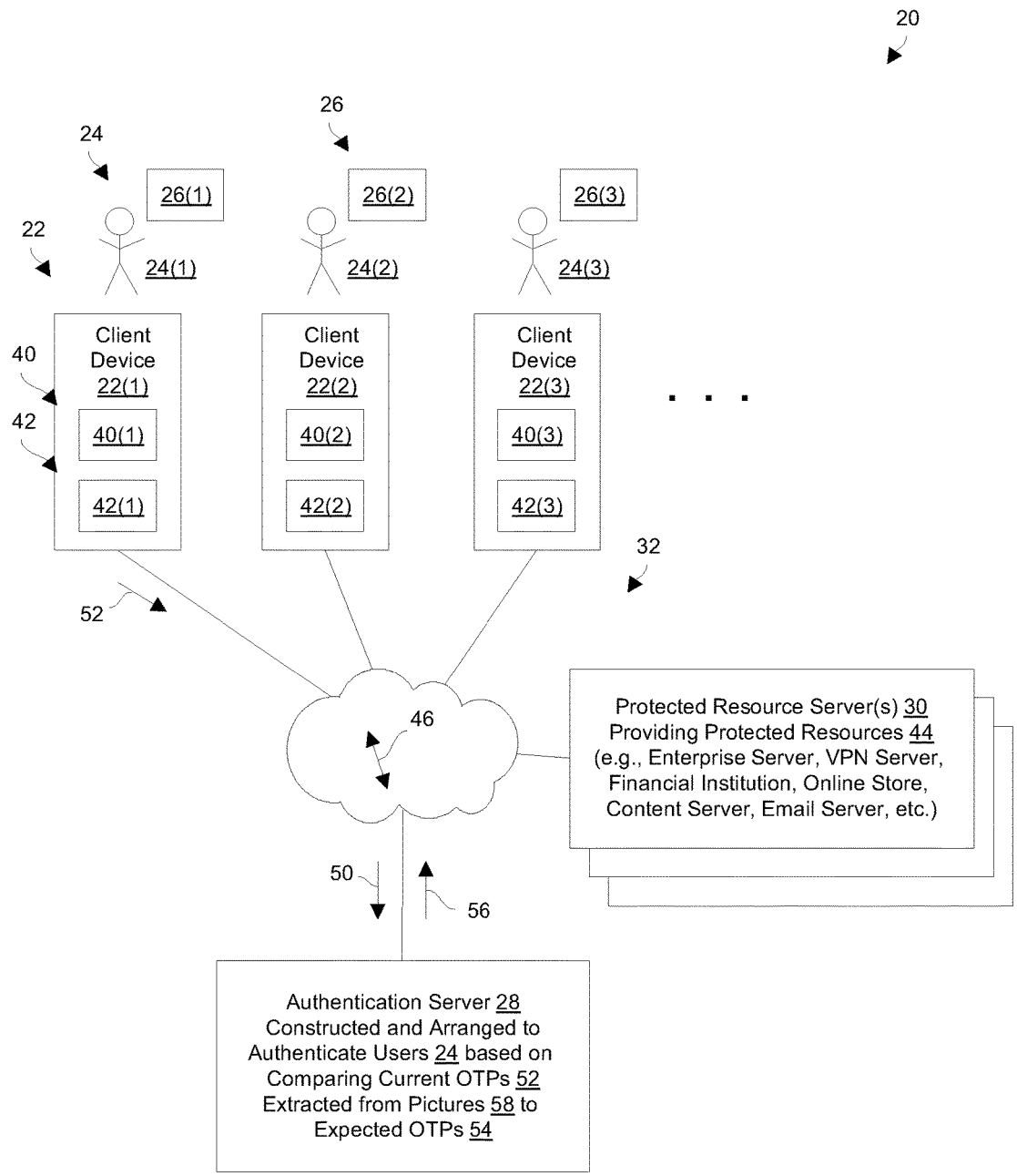
FIG. 1 is a block diagram of an electronic environment which is suitable for a user to take a picture of a current OTP and using the picture to authenticate.

FIG. 1 shows an electronic environment 20 which is suitable for using pictures of OTPs to authenticate. The electronic environment 20 includes client devices 22(1), 22(2), 22(3), . . . (collectively, client devices 22) operated by respective users 24(1), 24(2), 24(3), . . . (collectively, users 24) possessing respective authentication tokens 26(1), 26(2), 26(3), . . . (collectively, authentication tokens 26), an authentication server 28, protected resource servers 30, and a communications medium 32.

Each client device 22 includes a camera 40 and OCR circuitry 42. That is, the client device 22(1) includes a camera 40(1) and OCR circuitry 42(1), the client device 22(2) includes a camera 40(2) and OCR circuitry 42(2), the client device 22(3) includes a camera 40(3) and OCR circuitry 42(3), and so on. A suitable form factor for a client device 22 is a mobile apparatus (e.g., a smart phone, a tablet, etc.) which is equipped with an embedded camera and processing circuitry which executes code of an OCR app. Another suitable form factor for a client device 22 is a desktop computer or workstation which is equipped with a webcam and processing circuitry which executes code of an OCR application. Other form factors for a client device 22 are suitable for use as well such as a door actuation system which is equipped with a security camera and controller, and so on.

Each authentication token 26 is issued to a specific user 24 and is intended to remain in possession of that user 24. Additionally, each authentication token 26 includes OTP circuitry and an electronic display to display OTPs provided by that OTP circuitry. Accordingly, the users 24 are able to authenticate using, as an authentication factor, "something that the users have" in their possession, i.e., the authentication tokens 26 which output OTPs specific to those users 24. A suitable form factor for an authentication token 26 is a hardware token, e.g., a dedicated apparatus in the shape a card, a fob, etc. to provide OTPs. Another suitable form factor for an authentication token 26 is a smart device (e.g., a smart phone, a tablet, a desktop computer, etc.) which is equipped with a soft token application.

The authentication server 28 is equipped to authenticate the users 24 based on OTPs provided by the users 24 via the client devices 22. If a current OTP provided by a user 24 matches an expected OTP for that user 24, the authentication server 28 deems authentication to be successful, i.e., the user 24 is deemed to be authentic. However, if the current OTP provided by the user 24 does not match the expected OTP for that user 24, the authentication server 28 deems authentication to be unsuccessful and the user 24 is not deemed to be authentic.

The protected resource servers 30 maintain protected resources 44. Such protected resources 44 are capable of being accessed remotely by the client devices 22 following successful authentication with the authentication server 28. Examples of suitable remote protected resources 44 include (among others) accounts and databases of enterprises, VPNs/gateways/other networks, account access and transaction access with banks/brokerages/other financial institutions, transaction access at online stores, databases containing movies/music/files/other content, access to email, access to applications and online games, and so on.

The communications medium 32 is constructed and arranged to connect the various components of the electronic environment 20 together to enable these components to exchange electronic signals 46 (e.g., see the double arrow 46). At least a portion of the communications medium 32 is illustrated as a cloud to indicate that the communications medium 32 is capable of having a variety of different topologies including backbone, hub-and-spoke, loop, irregular, combinations thereof, and so on. Along these lines, the communications medium 32 may include copper-based data communications devices and cabling, fiber optic devices and cabling, wireless devices, combinations thereof, etc. Furthermore, the communications medium 32 is capable of supporting LAN-based communications, SAN-based communications, cellular communications, combinations thereof, and so on.

During operation, the users 24 access the protected resources 44 to perform useful work. In order to obtain access to a protected resource 44, a user 24 must successfully authenticate with the authentication server 28. In particular, the authentication server 28 responds to an authentication request 50 initiated by the user 24 by comparing a current OTP 52 from the user 24 with an expected OTP 54 for the user 24 (e.g., cryptographic sequences derived from a shared secret). If the current OTP 52 and the expected OTP 54 match, the authentication server 28 outputs an authentication result 56 which grants the user 24 access to the protected resource 44. However, if the current OTP 52 and the expected OTP 54 do not match, the authentication server 28 outputs an authentication result 56 which denies the user 24 access to the protected resource 44.

To provide a current OTP 52 to the authentication server 28, a user 24 uses his/her client device 22 to take a picture 58 of his/her authentication token 26. In particular, the user 24 moves either the client device 22, the authentication token 26, or both so that the electronic display of the token 26 is in front of the camera 40 of the client device 22. The user 24 then takes a picture 58 to capture an image of the current OTP 52 on the display. The OCR circuitry 42 of the client device 22 then extracts the current OTP 52 from the captured image of the current OTP 52 on the picture 58, and the extracted OTP 52 is sent as a sequence of OTP digits along with other identifying information to the authentication server 28 to authenticate the user 24.

It should be understood that, when the protected resources 44 reside remotely on the protected resource servers 30, the users 24 may connect their client devices 22 to the protected resource servers 30 which in turn communicate with the authentication server 28 so that the involvement of the authentication server 28 is transparent to the users 24 (i.e., the protected resource servers 30 send the authentication requests 50 to the authentication server 28). However, in other arrangements, the protected resources 44 reside locally on the client devices 22 (e.g., lists of contacts, local databases, file access, locked applications, etc.) and the client devices 22 communicate directly with the authentication server 28. Further details will now be provided with reference to FIG. 2.

Figure 2:
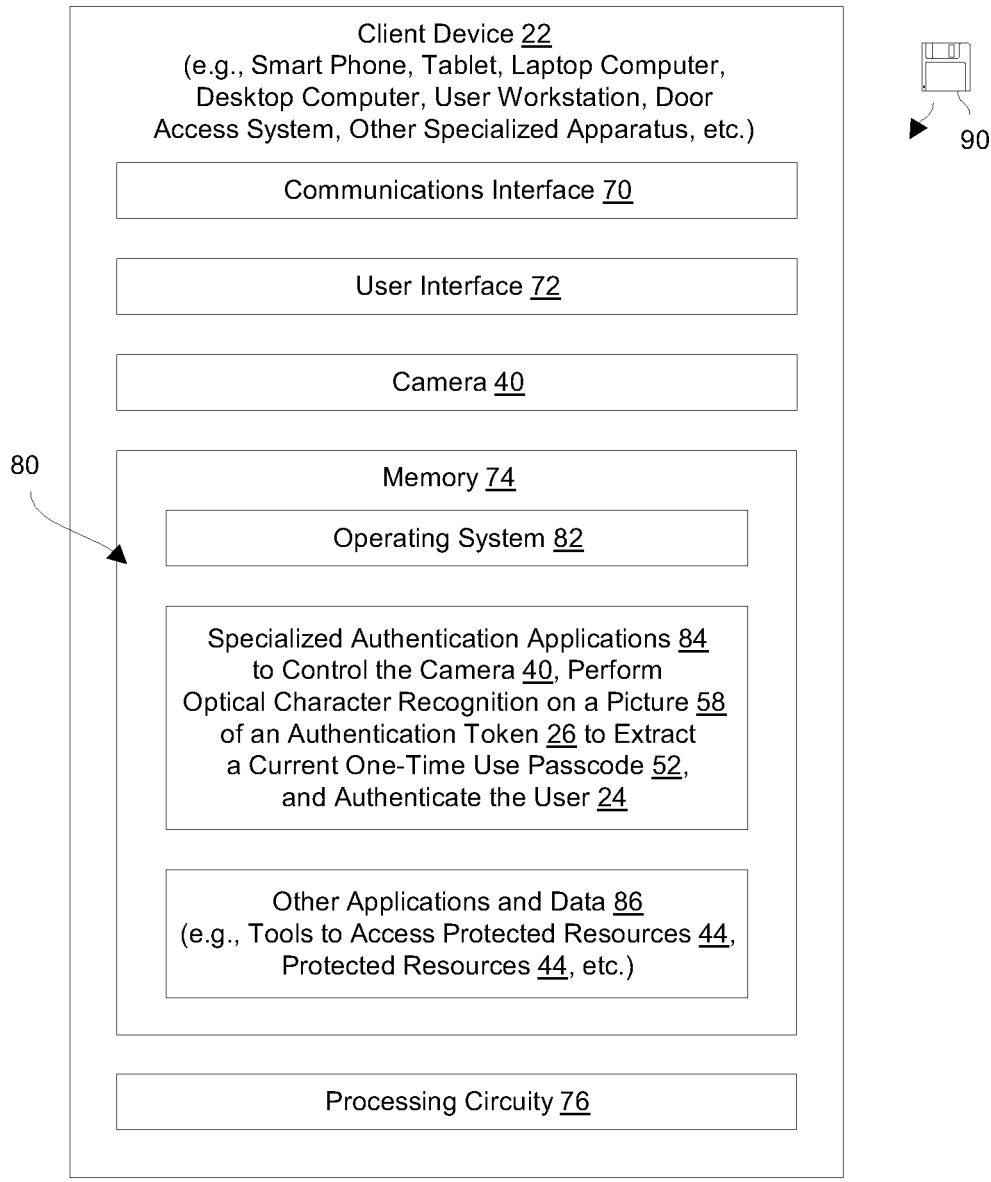
FIG. 2 is a block diagram of a client apparatus of the electronic environment of FIG. 1.

FIG. 2 is a block diagram of a client device 22 of the electronic environment 20. The client device 22 includes a communications interface 70, a user interface 72, a camera 40, memory 74, and processing circuitry 76.

The communications interface 70 is constructed and arranged to connect the client device 22 to the communications medium 32 (FIG. 1). Accordingly, the communications interface 70 enables the client device 22 to communicate with the other components of the electronic environment 20 (FIG. 1). Such communications may be copper-based, fiber-optic-based, or wireless (i.e., IP-based, SAN-based, cellular, Bluetooth, combinations thereof, and so on).

The user interface 72 is constructed and arranged to receive user input from the user 24, and to provide user output to the user 24. Along these lines, if the client device 22 is a smart phone or tablet, the user interface 72 may include a touch screen which receives user gestures (e.g., button presses, finger swipes, etc.) and outputs graphical data. Alternatively, if the client device 22 is a desktop computer, the user interface 72 may include a traditional keyboard, a mouse, and electronic monitor.

The camera 40 is constructed and arranged to sense images using an image sensor (e.g., a lens in combination with a charge-coupled device sensor), and to provide digital data representing the sensed images (e.g., pixelated data in a file). Due to the form factor of the client device 22, the camera 40 may be embedded within a housing of the client device 22. Alternatively, the camera 40 may be a peripheral component which is external to the housing of the client device 22, but nevertheless is considered to be part of the client device 22.

The memory 74 is intended to represent both volatile storage (e.g., DRAM, SRAM, etc.) and non-volatile storage (e.g., flash memory, magnetic disk drives, etc.). The memory 74 stores a variety of software constructs 80 including an operating system 82 to manage the computerized resources of the client device 22 (e.g., memory space, processing cycles, etc.), specialized authentication applications 84 to control the camera 40, perform OCR on a picture 58 of an authentication token 26 to extract a current OTP 52, and to communicate with the authentication server 28 to authenticate the user 24 using the extracted current OTP 52. The memory 74 can store other applications and data 86 as well such as tools to access protected resources 44 (e.g., a browser application, an email application, a content viewer, a specialized graphical user interface application, enterprise software, and so on).

The processing circuitry 76 is constructed and arranged to operate in accordance with the various software constructs 80 stored in the memory 74. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the client device 22. The computer program product 90 has a non-transitory (or non-volatile) computer readable medium which stores a set of instructions which controls one or more operations of the client device 22. Examples of suitable computer readable storage media include tangible articles of manufacture and apparatus which store instructions in a non-volatile manner such as CD-ROM, flash memory, disk memory, tape memory, and the like.

During operation, the client device 22 runs in accordance with the specialized authentication applications 84 to reliably and robustly authenticate the user 24 to control access to the protected resources 44 within the electronic environment 20. To this end, the user 24 operates specialized control circuitry which is formed by the processing circuitry 76 executing the specialized authentication applications 84. In particular, the user 24 takes a picture 58 of the electronic display of the authentication token 26 in possession of the user 24 while the electronic display outputs a current OTP 52. At this point, the picture 58 contains an image of the current OTP 52 but the picture 58 is not in a format that the authentication server 28 can use to properly authenticate the user 24.

The specialized control circuitry then extracts the current OTP 52 from the image. In particular, the specialized control circuitry (also see the OCR circuitry 42 in FIG. 1) performs OCR operations to obtain, as the current OTP 52, a series of OTP digits which includes numbers, characters, meta-characters, combinations thereof, and so on. In some arrangements, the authentication token 26 outputs special non-alphanumeric patterns on a row of seven-segment displays which is available for picture taking by the client device 22.

The specialized control circuitry then sends the current OTP 52 extracted from the picture 58 to the authentication server 28 through the communications medium 32. If the authentication server 28 determines that authentication is successful based on the current OTP 52 extracted from the picture 58, the authentication server 28 grants access to the protected resource 44 (e.g., see the authentication result 56 in FIG. 1). However, if the authentication server 28 determines that authentication is unsuccessful based on the current OTP 52 extracted from the picture 58, the authentication server 28 denies access to the protected resource 44.

In some arrangements, the user 24 is prompted by the specialized circuitry for a command which approves the current OTP 52 for use in authentication prior to the specialized control circuitry sending the current OTP 52 to the authentication server 28. For example, the user 24 views the picture 58 which is taken by the camera 40 before the OCR operations are performed on the picture 58. Accordingly, if the picture 58 is blurry or if part of the token display is cut off, the user 24 may decide to retake the picture 58 rather than process the original picture 59 through OCR.

In other arrangements, the user 24 views the results of the OCR operation performed on the picture 58, i.e., the resulting series of OTP digits. Here, the user 24 can still double check the current OTP 52 before entering a command which directs the client device 22 to send the current OTP 52 to the authentication server 28.

In some arrangements, the specialized control circuitry, which is formed by the processing circuitry 76 executing the specialized authentication applications 84, performs error checking on the current OTP 52 before allowing the user 24 to submit the current OTP 52 to the authentication server 28. Along these lines, the specialized control circuitry verifies that the OCR operations have recognized the proper number of OTP digits for correct authentication (e.g., six, eight, 10, 12, etc.). Also, the specialized control circuitry verifies that the OCR operations have not outputted an invalid digit, and so on. Such operation prevents the client device 22 from submitting, as the current OTP 52, an invalid series of OTP digits which is guaranteed to fail. Accordingly, such operation prevents unintentional lockout of the user 24 (due to a series of failed authentication attempts) and reduces overhead on the authentication server 28. Further details will now be provided with reference to FIG. 3.

Figure 3:
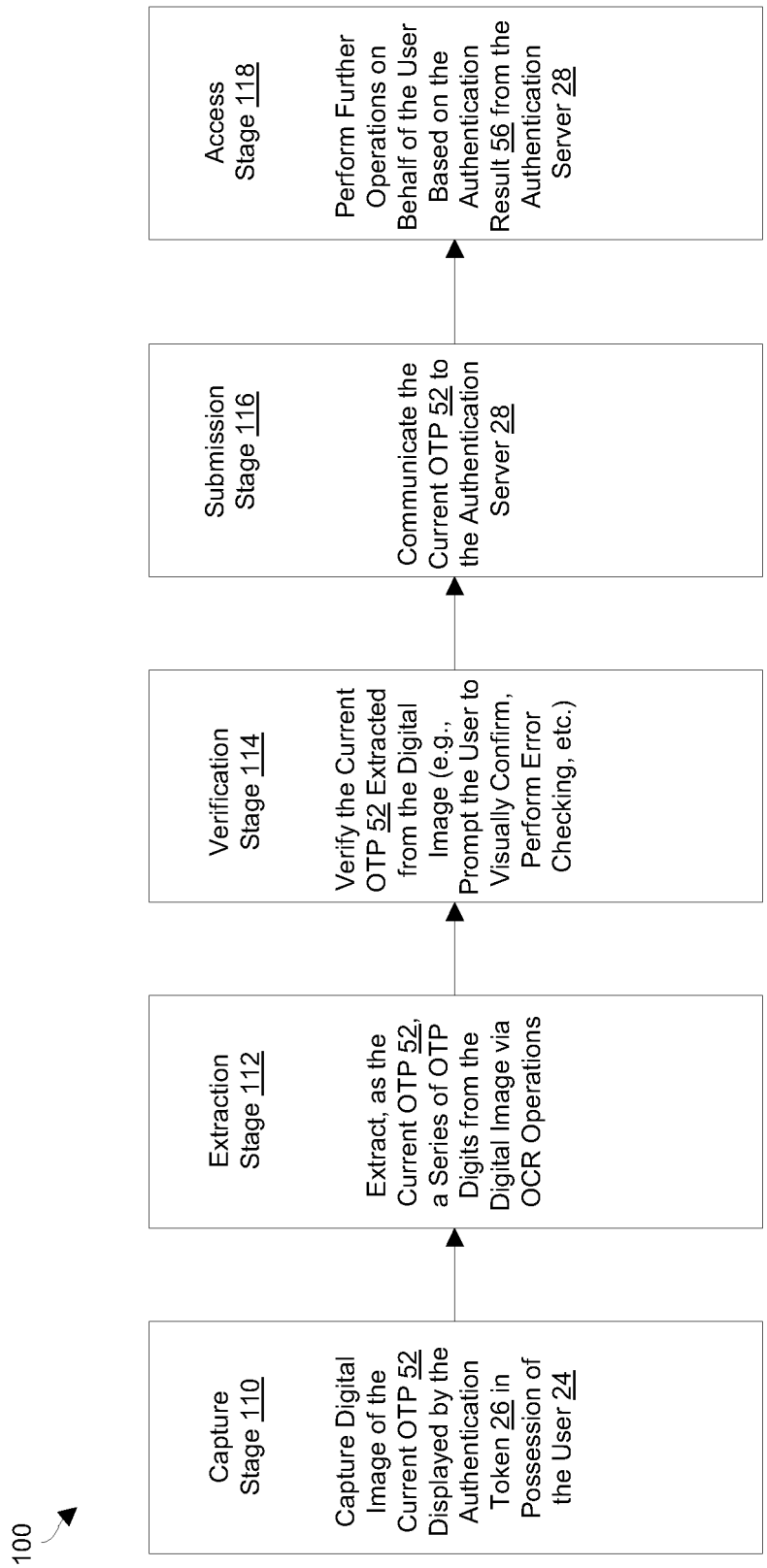
FIG. 3 is a block diagram of particular stages of the authentication process when authenticating a user of the electronic environment of FIG. 1.

FIG. 3 shows particular stages of the authentication process 100 which is performed by a client device 22 during authentication of a user 24. The authentication process 100 includes a capture stage 110, an extraction stage 112, a verification stage 114, a submission stage 116, and an access stage 118.

In the capture stage 110, the client device 22 captures a digital image of a current OTP 52 displayed by an authentication token 26 in possession of the user 24. In particular, the user 24 directs the client device 22 to take a picture 58 of the current OTP 52 displayed by an authentication token 26. The client device 22 then snaps a picture 58 (i.e., a digital photo) of the current OTP 52 (i.e., the image of the current OTP 52 is in the picture 58) and stores the picture 58 locally in memory (e.g., as a file). In some arrangements, prior to capturing the digital photo, the user interface 72 of the client device 22 (e.g., an electronic display) provides a set of instructions directing the user 24 to visually display the OTP 52 to the digital camera 40 of the client device 22.

In the extraction stage 112, the client device 22 extracts, as the current OTP 52, a series of OTP digits from the picture 58 stored in memory. In particular, the client device 22 performs OCR operations on the image of the current OTP 52 in the picture 58 (e.g., a two-dimensional pixelated image) to individually recognize each OTP digit of the series of OTP digits. In some arrangements, prior to extracting the current OTP 52, the user interface 72 of the client device 22 displays the picture 58 in case the user 24, after viewing the picture 58, wishes to retake the picture 58.

In the verification stage 114, the client device 22 confirms that the extracted OTP 52 is acceptable for submission to the authentication server 28. Along these lines, the user 24 may visually double check the extracted OTP 52 (e.g., confirm that the extracted OTP 52 is readable, confirm that the extracted OTP 52 matches what is displayed on the authentication token 26, etc.). Additionally, the client device 22 performs an error checking operation to make sure that the extracted OTP 52 comports with certain predefined OTP requirements (e.g., to make sure there is not a missing OTP digit, to make sure there is not an extra OTP digit, to make sure the OTP digits do not include an invalid character, etc.). In some arrangements, the user interface 72 of the client device 22 displays the extracted OTP 52 and prompts the user 24 for a command to submit the extracted OTP 52 for authentication processing.

In the submission stage 116, the client device 22 communicates with the authentication server 28. In particular, the client device 22 sends the current OTP 52 to the authentication server 28 directly (e.g., if the protected resource 44 resides locally within the client device 22) or indirectly (e.g., if the client device 22 is communicating directly with a protected resource server 30 which is in turn communicating with the authentication server 28). Such communications may include one or more layers of security (e.g., encryption, certificate exchange, tunneling, etc.).

In the access stage 118, the client device 22 performs operations based on an authentication result 56 from the authentication server 28 (also see FIG. 1). In particular, if the authentication result 56 indicates successful authentication, the user 24 is able to access the protected resource 44. However, if the authentication result 56 indicates unsuccessful authentication, the user 24 is denied access to the protected resource 44. Further details will now be provided with reference to FIGS. 4 and 5.

Figure 4:
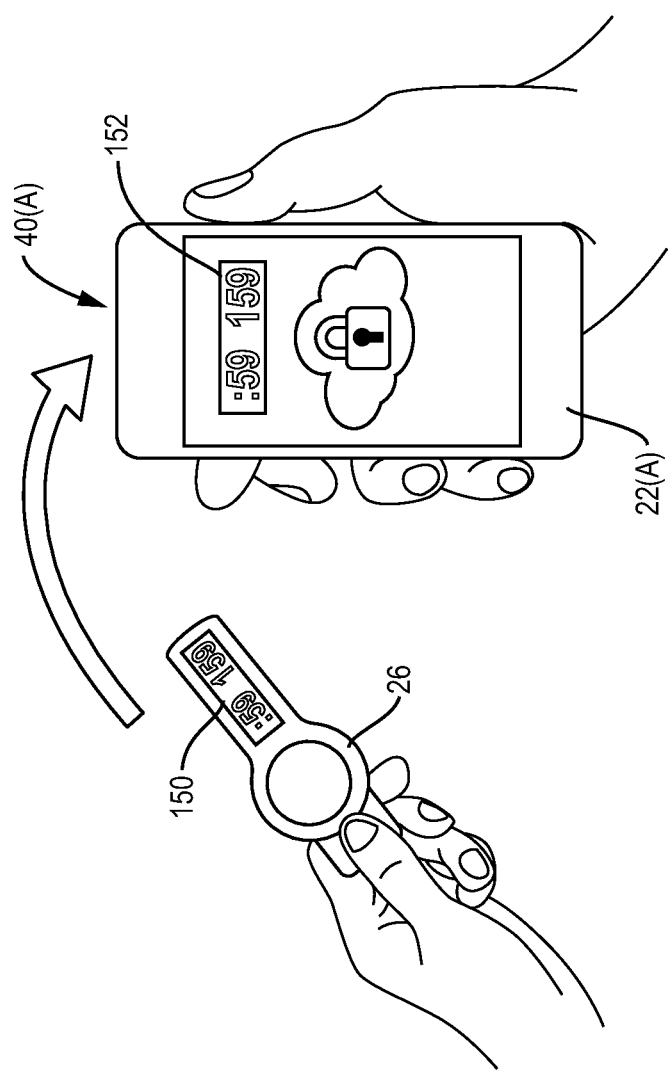
FIG. 4 is a perspective view of a first example situation of electronic environment of FIG. 1.
Figure 5:
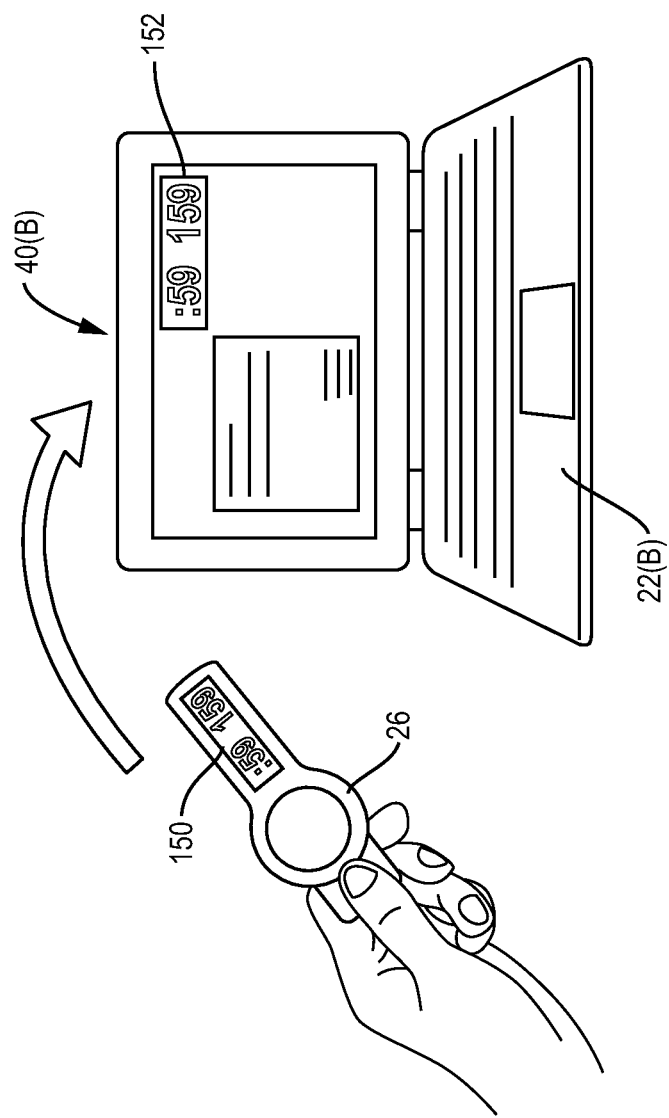
FIG. 5 is a perspective view of a second example situation of electronic environment of FIG. 1.

FIGS. 4 and 5 show example situations for capturing a digital image of a current OTP 52 displayed on the display 150 of an authentication token 26 in possession of a user 24. FIG. 4 involves a smart phone as the client device 22. FIG. 5 involves a laptop or a desktop computer as the client device 22.

As shown in FIG. 4, a user 24 maneuvers a smart phone 22(A) so that the lens of the camera 40(A) of the smart phone 22(A) is aimed at the display 150 (e.g., a multi-segment LCD screen) of the authentication token 26. The user 24 then directs the smart phone 22(A) to take a picture 58 of the display 150 of the authentication token 26 (e.g., by pressing a button on the smart phone 22(A)). Once the smart phone 22(A) takes the picture 58, the current OTP 52 from the display 150 of the authentication token 26 is now entered into the smart phone 22(A) and presented on a screen 152 of the smart phone 22(A) to the user 24 for confirmation.

As shown in FIG. 5, a user 24 holds the authentication token 26 in front of a camera 40(B) of a laptop computer 22(B) so that the lens of the laptop computer camera 40(B) is aimed at the display 150 of the authentication token 26. The user 24 then directs the laptop computer 22(B) to take a picture 58 of the display 150 of the authentication token 26 (e.g., by pressing a button). Once the laptop computer 22(B) takes the picture 58, the current OTP 52 from the display 150 is now entered into the laptop computer 22(B) and presented on a screen 152 of the laptop computer 22(B) to the user 24 for confirmation. Further details will now be provided with reference to FIG. 6.

Figure 6:
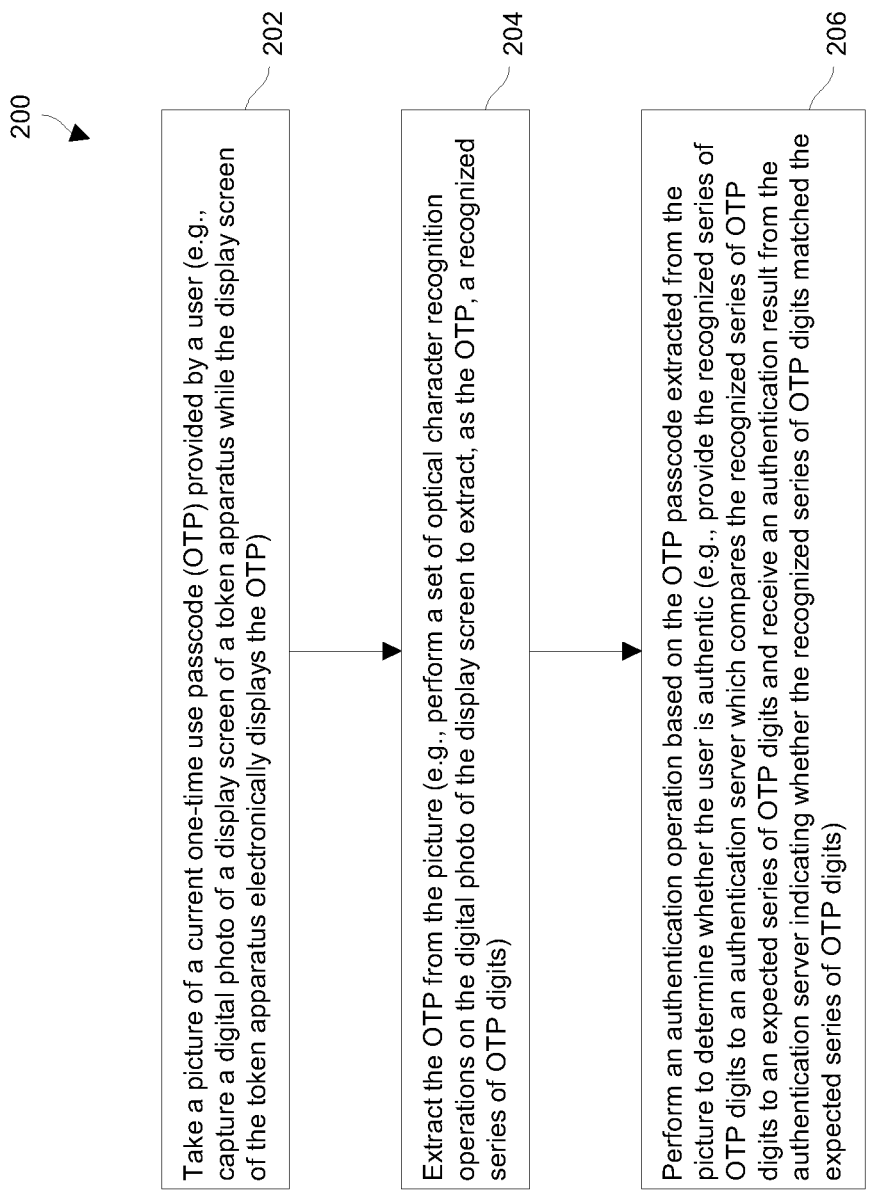
FIG. 6 is a flowchart of a procedure which is performed by the electronic environment of FIG. 1.

FIG. 6 is a flowchart of a computerized procedure 200 which is performed by a client device 22 during user authentication. At 202, the client device 22 takes a picture of a current OTP provided by a user. Here, the client device 22 captures a digital photo of a display screen of a token apparatus while the display screen of the token apparatus electronically displays the OTP.

At 204, the client device 22 extracts the OTP 52 from the picture. Here, the client device 22 performs a set of OCR operations on the digital photo of the display screen to extract, as the OTP, a recognized series of OTP digits (each OTP digit is individually recognized during the OCR process).

At 206, the client device 22 performs an authentication operation based on the OTP extracted from the picture to determine whether the user is authentic. In particular, the client device 22 provides the recognized series of OTP digits to an authentication server which compares the recognized series of OTP digits to an expected series of OTP digits, and receives an authentication result from the authentication server indicating whether the recognized series of OTP digits matches the expected series of OTP digits.

As described above, an improved technique involves a user 24 taking a picture 58 of a current OTP 52 and using the picture 58 to authenticate. The current OTP 52 is then extracted from the picture 58 (e.g., using optical character recognition). Such techniques alleviate the burden and frustration of the user 24 having to manually type in the current OTP 52. Additionally, the user 24 will not trigger a lockout via accidental typing errors. Furthermore, the current OTP 24 can be augmented to include more than a string of six or eight alphanumeric characters for stronger security (e.g., by using non-alphanumeric characters, by capturing longer multi-digit seven-segment LCD display patterns, and so on).

One should appreciate that the above-described techniques are not merely authenticating using a camera. Rather, a user takes a picture of a current OTP 52, and OCR circuitry extracts the current OTP 52 from the image in the picture. In particular, the OCR circuitry individually recognizes each OTP digit from the image of the current OTP 52 in the picture 58. Such techniques alleviate the need for the user 24 to tediously type in OTPs manually which is prone to error and can inadvertently lockout a legitimate user.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various servers of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

One will appreciate that a performance indicator for an authentication process may be the time-to-authenticate. In particular, fast and easy authentication methods will gain higher adoption and will be less bound to be bypassed by frustrated users. The techniques disclosed herein significantly accelerate and ease the use of authentication tokens for both computers and mobile devices. In particular, using an authentication token which provides OTPs together with the available camera in a laptop, mobile device, etc. provides the user with an easier authentication experience. Instead of the tedious task of typing the OTP digits into a specific text field in a web page or mobile app, the user simply presents the token in front of the device's camera. In some arrangements, an image processing algorithm captures the content of the token and an OCR algorithm unravels the enclosed digits and instantly populate the relevant field in the authentication request. Such a technique is particularly well suited for authenticating to mobile apps where typing the OTP using the soft keyboard might be time consuming and difficult. However, presenting the token to the mobile device camera is much faster and easier. In the case of a soft token, the mobile device with the OTP can be presented to a computerized device equipped with a camera for instant authentication.

In some arrangements, the user presents the token's OTP to an embedded camera. Under the hood, the OTP is instantly captured, extracted and sent to the authentication server to continue with the usual authentication flow.

In some arrangements, a soft-token on a smart phone is used and the user presents the OTP that is displayed on the smart phone to the camera of another computerized device. The usage of the camera for authentication opens the door for enhanced authentication techniques. For example, without the need for typing, the OTPs are no longer limited to digits only. In some arrangements, the OTP digits are replaced with a one-time-barcode or QR code, a one-time-image, a one-time-polynom, and so on.

Furthermore, in some arrangements, the client devices 22 send the pictures 58 of the current OTPs 52 to the authentication server 28 rather than the OCR'd (extracted) OTPs 52. In these arrangements, the authentication server 28 performs the OCR operations to individually extract each OTP digit from the pictures 58 to form the current OTPs 52 for comparison with expected OTPs 54. Such modifications and enhancements are intended to belong to various embodiments of the disclosure.

What is claimed is:
1. A computer-implemented method of providing authentication,
the computer-implemented method comprising:
taking, by processing circuitry, a picture of a one-time passcode (OTP) provided by a user;

extracting, by the processing circuitry, the OTP from the picture; and performing, by the processing circuitry, an authentication operation based on the OTP extracted from the picture to determine whether the user is authentic;

wherein taking the picture of the OTP provided by the user includes:

capturing, by the processing circuitry, an OTP image displayed by an electronic display, the OTP being visually discernable in the captured OTP image;

wherein performing the authentication operation includes:

matching, by the processing circuitry, the OTP that is visually discernable in the captured OTP image to an expected OTP to determine whether the user is authentic;

wherein the electronic display is a display screen of a token apparatus;

wherein capturing the OTP image includes:

acquiring a digital photo of the display screen of the token apparatus while the display screen of the token apparatus electronically displays the OTP;

wherein extracting the OTP from the picture includes:

performing a set of operations on the digital photo of the display screen to extract, as the OTP, a recognized series of OTP digits; and wherein performing the authentication operation based on the OTP extracted from the picture to determine whether the user is authentic further includes:

providing the recognized series of OTP digits to an authentication server which compares the recognized series of OTP digits to an expected series of OTP digits; and receiving an authentication result from the authentication server indicating whether the recognized series of OTP digits matched the expected series of OTP digits.

2. The computer-implemented method as in claim 1 wherein performing the set of operations on the digital photo of the display screen includes performing a set of optical character recognition (OCR) operations on the digital photo of the display screen.

3. The computer-implemented method as in claim 1 wherein the token apparatus is a hand-held hardware authentication token having, as the display screen, a multi-segment liquid-crystal display (LCD) screen; and wherein acquiring the digital photo includes using a digital camera to electronically generate a two-dimensional pixelated image of the multi-segment LCD screen of the hand-held hardware authentication token while the user holds the multi-segment LCD screen of the hand-held hardware authentication token in front of a lens of the digital camera.

4. The computer-implemented method as in claim 3 wherein the digital camera is embedded within a smart mobile device; and wherein acquiring the digital photo further includes storing the two-dimensional pixelated image in an image file within the smart mobile device.

5. The computer-implemented method as in claim 1 wherein the token apparatus is a smart mobile device running a soft token application; and wherein acquiring the digital photo includes using a digital camera to electronically acquire a two-dimensional pixelated image of a touch screen of the smart mobile device while the user holds the touch screen of the smart mobile device in front of a lens of the digital camera.

6. The computer-implemented method as in claim 5 wherein the digital camera is coupled to a desktop computer; and wherein acquiring the digital photo further includes storing the two-dimensional pixelated image in an image file within the desktop computer.

7. The computer-implemented method as in claim 1 wherein the processing circuitry includes an interface screen and a digital camera; and wherein the method further comprises:

prior to acquiring the digital photo, providing a set of instructions on the interface screen to direct the user to visually display the OTP to the digital camera.

8. The computer-implemented method as in claim 7, further comprising:

prior to extracting the OTP, displaying the digital photo on the interface screen and prompting the user for a command to submit the digital photo for authentication processing.

9. The computer-implemented method as in claim 1 wherein the processing circuitry includes local circuitry residing in a user device and remote circuitry residing in the authentication server; and wherein providing the recognized series of OTP digits to the authentication server includes:

conveying, as the picture, an image file from the local circuitry residing in the user device to the remote circuitry residing in the authentication server over a computer network.

10. The computer-implemented method as in claim 1 wherein the processing circuitry that captures the OTP image forms part of a smart device;

wherein the token apparatus is a dedicated authentication token device and has a handheld form factor;

wherein the user provides the OTP by maneuvering the handheld form factor of the dedicated authentication token device in front of a camera of the smart device while the display screen of the dedicated authentication token device displays the OTP; and wherein acquiring a digital photo of the display screen of the token apparatus while the display screen of the token apparatus electronically displays the OTP includes operating the camera of the smart device to obtain a view of the display screen of the dedicated authentication token device while the display screen of the dedicated authentication token device displays the OTP.

11. An electronic apparatus, comprising:

a digital camera;

memory; and control circuitry coupled to the digital camera and the memory, the memory storing instructions which, when carried out by the control circuitry, cause the control circuitry to:

take a picture of a one-time passcode (OTP) provided by a user using the digital camera, extract the OTP from the picture, and perform an authentication operation based on the OTP extracted from the picture to determine whether the user is authentic;

wherein the control circuitry, when taking the picture of the OTP provided by the user, is constructed and arranged to:

capture an OTP image displayed by an electronic display, the OTP being visually discernable in the captured OTP image; and wherein the control circuitry, when performing the authentication operation, is constructed and arranged to:
  match the OTP that is visually discernable in the captured OTP image to an expected OTP to determine whether the user is authentic
wherein the electronic display is a display screen of a token apparatus;
wherein the control circuitry, when taking the picture of the OTP provided by the user, is constructed and arranged to:
  acquire a digital photo of the display screen of the token apparatus while the display screen of the token apparatus electronically displays the OTP;
wherein the control circuitry, when extracting the OTP from the picture, is constructed and arranged to:
  perform a set of operations on the digital photo of the display screen of the token apparatus to extract, as the OTP, a recognized series of OTP digits; and
wherein the control circuitry, when performing the authentication operation based on the OTP extracted from the picture to determine whether the user is authentic, is constructed and arranged to:
  provide the recognized series of OTP digits to an authentication server which compares the recognized series of OTP digits to an expected series of OTP digits, and
  receive an authentication result from the authentication server indicating whether the recognized series of OTP digits matched the expected series of OTP digits.

12. The electronic apparatus as in claim 11 wherein performing the set of operations on the digital photo of the display screen of the token apparatus includes performing a set of optical character recognition (OCR) operations on the digital photo of the display screen.

13. The electronic apparatus as in claim 12, further comprising:
an interface screen coupled to the control circuitry; and
wherein the control circuitry is further constructed and arranged to:
  prior to capturing the digital photo, provide a set of instructions on the interface screen directing the user to visually display the OTP to the digital camera, and
  prior to extracting the OTP, display the digital photo on the interface screen to the user and prompt the user for a command to submit the digital photo for authentication processing.

14. A computer program product having a non-transitory computer readable medium which stores a set of instructions to provide authentication, the set of instructions, when carried out by computerized circuitry, causing the computerized circuitry to perform a method of:
  taking a picture of a one-time passcode (OTP) provided by a user;
  extracting the OTP from the picture; and
  performing an authentication operation based on the OTP extracted from the picture to determine whether the user is authentic;
  wherein taking the picture of the OTP provided by the user includes:
  capturing an OTP image displayed by an electronic display, the OTP being visually discernable in the captured OTP image; and
  wherein performing the authentication operation includes:
  matching the OTP that is visually discernable in the captured OTP image to an expected OTP to determine whether the user is authentic;
  wherein the electronic display is a display screen of a token apparatus; wherein capturing the OTP image includes:
  acquiring a digital photo of the display screen of the token apparatus while the display screen of the token apparatus electronically displays the OTP;
  wherein extracting the OTP from the picture includes:
  performing a set of operations on the digital photo of the display screen to extract, as the OTP, a recognized series of OTP digits; and
  wherein performing the authentication operation based on the OTP extracted from the picture to determine whether the user is authentic further includes:
  providing the recognized series of OTP digits to an authentication server which compares the recognized series of OTP digits to an expected series of OTP digits, and
  receiving an authentication result from the authentication server indicating whether the recognized series of OTP digits matched the expected series of OTP digits.

15. The computer program product as in claim 14 wherein performing the set of operations on the digital photo of the display screen includes performing a set of optical character recognition (OCR) operation on the digital photo of the display screen.

16. The computer program product as in claim 15 wherein the computerized circuitry includes an interface screen and a digital camera; and wherein the method further comprises:
  prior to acquiring the digital photo, providing a set of instructions on the interface screen to direct the user to visually display the OTP to the digital camera, and
  prior to extracting the OTP, displaying the digital photo on the interface screen and prompting the user for a command to submit the digital photo for authentication processing.

* * * * *